Figure 3:
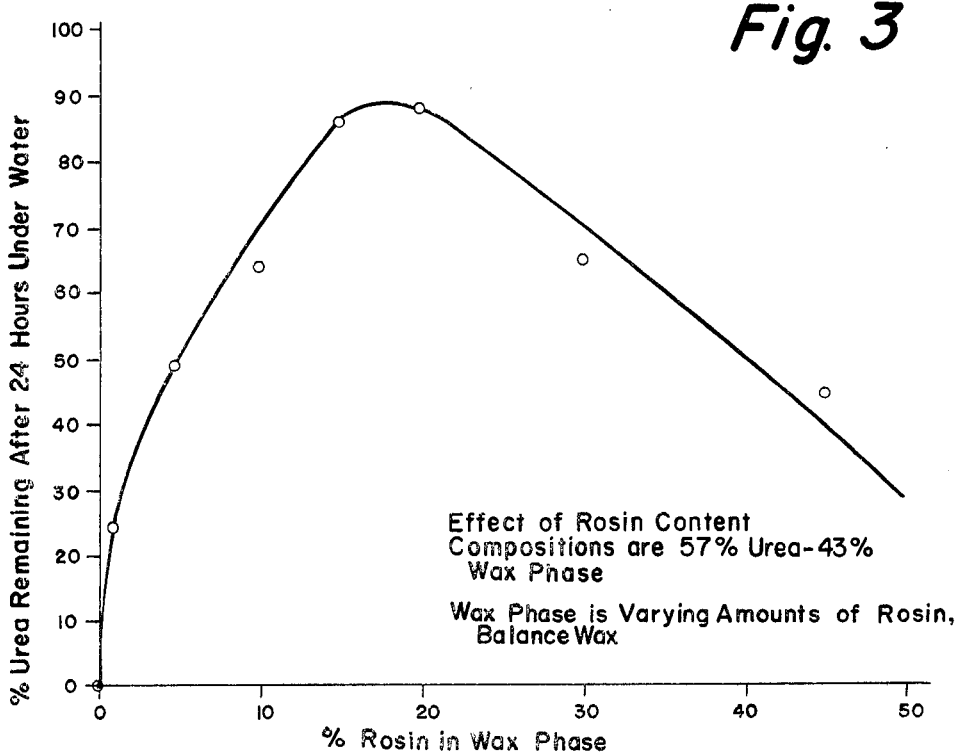

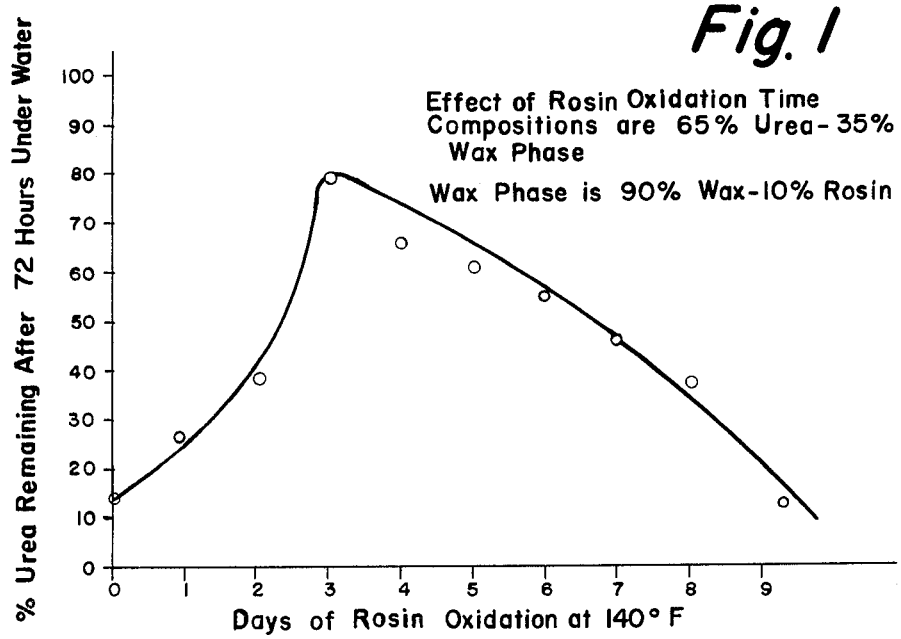
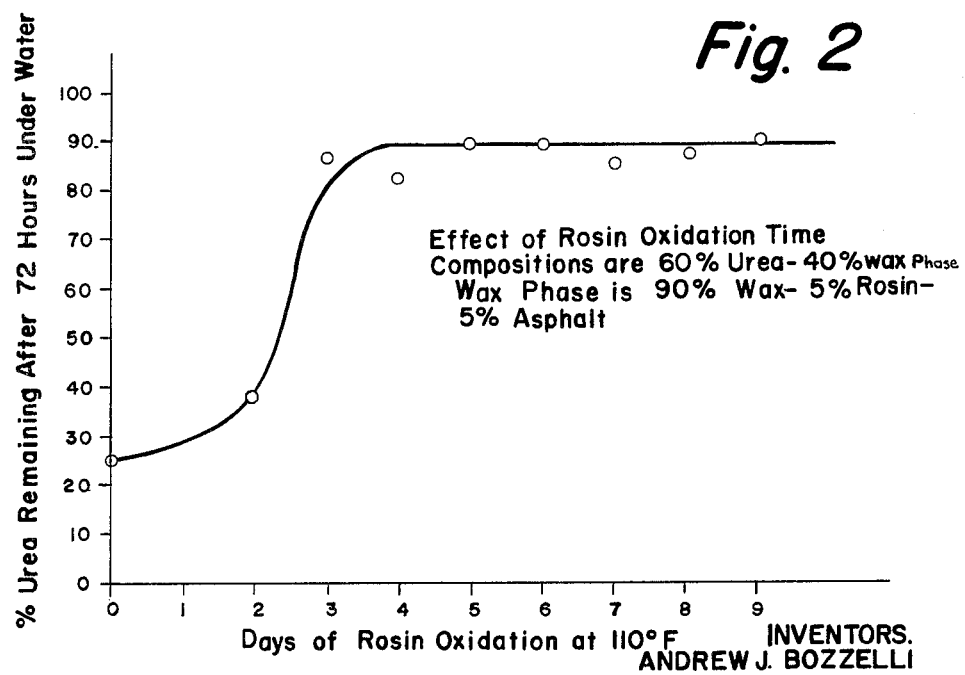

United States Patent Office 3,252,786
Patented May 24, 1966

3,252,786
SLOW RELEASE FERTILIZERS AND METHOD
OF MAKING
Andrew J. Bozzelli, Springfield, Pa., Steven G. Belak, Claymont, Del., and Robert H. Campbell, Brookhaven, Pa., assignors to Sun Oil Company, Philadelphia, Pa., a corporation of New Jersey
Filed Sept. 11, 1963, Ser. No. 308,251
15 Claims. (Cl. 71—64)

This application is a continuation-in-part of Serial No. 244,278, filed December 13, 1962, and now abandoned; and of Serial No. 227,085, filed September 28, 1962, and now abandoned.

This invention relates in one aspect to slow release fertilizer compositions containing urea, wax, rosin, and, optionally, asphalt. The invention also pertains to certain methods which overcome particular difficulties which arise in the preparation of slow release fertilizers. One method provides a means by which a stable dispersion of urea in molten paraffin wax can be prepared. The dispersion is stable in that the urea and molten paraffin wax do not react to form an adduct. Another method of the invention provides a means by which a dispersion of a solid fertilizer in molten wax can be prepared which is of fluid consistency rather than of putty-like, unfluid consistency.

Nitrogen, postassium, and phosphorus are essential elements for plant growth and commercially available fertilizers invariably contain one or more of these elements. Examples of fertilizer compounds in frequent use at the present time are urea, ammonium nitrate, potassium chloride, monoammonium phosphate, diammonium phosphate, calcium cyanamide, potassium nitrate, potassium sulfate, sodium nitrate, superphosphate (a mixture of calcium acid phosphate and calcium sulfate), and triple superphosphate (calcium acid phosphate). Urea is a preferred source of nitrogen because it contains a higher precentage of nitrogen than the other nitrogen fertilizers mentioned.

The number of fertilizer compounds applied to the soil at a given time depends mainly upon the soil analysis and the crops to be grown in the soil. In some cases only nitrogen is needed and only a nitrogen fertilizer is applied. In the majority of cases, however, all three essential elements are needed and in such cases the fertilizer actually applied to the soil is a blend of a nitrogen fertilizer, a potassium fertilizer, and a phosphorus fertilizer. Some compounds, of course, such as diammonium phosphate, contain more than one essential element. A fertilizer containing all three essential elements is conventionally referred to as a complete fertilizer. In the case of any fertilizer, complete or otherwise, it is also conventional to state the amount of each essential element in the fertilizer by a series of numbers which refer, in order, to the weight percentage of nitrogen (as N), phosphorus (as $P_2O_5$), and potassium (as $K_2O$) in the fertilizer. Thus a 20–10–5 fertilizer contains 20% nitrogen as N, 10% phosphorus as $P_2O_5$, and 5% potassium as $K_2O$.

Unfortunately most of the commercial fertilizers mentioned previously are readily water soluble and this creates a number of disadvantages. In a heavy rainfall much of the fertilizer may be dissolved in the rainwater and soaked into the ground below the plant roots or rapidly carried away by flowing surface water. This fertilizer never becomes available to the plants. In addition, the readily soluble compounds often become available too rapidly to the plant resulting in injury to the plant rather than benefit. This is often noticed in "burned" lawns or crops. Another disadvantage of high fertilizer solubility is that the fertilizer is often consumed before the end of the growing season. Whether the fertilizer has been soaked out of reach of the plant roots or whether it has been too rapidly absorbed by the plants, it frequently happens that all the fertilizer ingredients are gone at a time when the plant is still growing. The plants must then be refertilized in order to maintain optimum plant growth.

One method of reducing the rate at which the fertilizer is consumed is to mix the fertilizer and molten wax, i.e., disperse the fertilizer in molten wax, form the dispersion into small particles in a mold, and allow the particles to cool below the melting point of the wax. The resulting particles are a dispersion of solid fertilizer particles in solid wax. Substantially all the fertilizer particles are surrounded by and encased in wax. The particles can also be described as a slow release fertilizer because the water resistance of the dispersed fertilizer compound is higher than the water resistance of the fertilizer compound when not dispersed in wax.

It was mentioned previously that urea is a preferred source of nitrogen because it contains a relatively high (47%) amount of nitrogen. This feature of urea becomes especially valuable when a slow release fertilizer containing a source of nitrogen is prepared in the manner described above. The wax portion of the fertilizer obviously contributes no nitrogen, potassium, or phosphorus; in fact the wax dilutes the essential element content of the fertilizer compounds. This being the case it becomes more important to utilize fertilizer compounds containing as high a percentage as possible of essential elements. For this reason most slow release fertilizers will contain urea as a source of nitrogen.

When a slow release fertilizer comprising a dispersion of urea, and other fertilizer compounds as the case may be, in wax is prepared in the manner described above, three serious problems are encountered. Two of these problems are processing difficulties, i.e., they arise during the preparation of the fertilizer, while the other problem is a disadvantage of the final composition itself. One of the processing problems also arises when a fertilizer other than urea is used. These problems are described in detail as follows, along with a brief description of the solution provided therefor by the present invention. Following such descriptions the solutions provided by the present invention are described in detail.

The disadvantage of the composition itself is that its water resistance is sometime not high enough. Although urea dispersed in wax has a higher water resistance than urea alone, and is therefore properly referred to as a slow release fertilizer, its water resistance is not always high enough to prevent the fertilizer from being too rapidly consumed by the plants, from being soaked into the ground below the plants roots, etc. Consequently, a method of improving the water resistance of a urea-wax slow release fertilizer is desirable. We have now found that if a small amount of rosin is dissolved in i.e., incorporated into, the wax component of such a slow release fertilizer a substantial improvement in water resistance is obtained. In addition, several specific types of rosin effect an improvement in water resistance distinctly superior to the improvement obtained with other types of rosin. We have also found that if a small amount of asphalt is also incorporated into the wax component, in addition to rosin, a further improvement in water resistance is effected. Each such improvement in water resistance can be effected only by the use of a relatively small amount of the appropriate additive. Large amounts of the additive result in just the opposite effect, i.e., a decrease in water resistance. The aspect of the invention relating to improved water resistance is described in more detail hereafter under the heading, "Improved Water Resistance," subdivided into a "Rosin" portion and an "Asphalt" portion.

One of the aforesaid processing difficulties arises when the wax component of the urea-wax slow release fertilizer is a paraffin wax. Paraffin wav is a preferred type of wax for use in slow release fertilizers because of its frequently lower cost. When urea is mixed with, i.e., dispersed in, molten paraffin wax, preparatory to forming small slow release fertilizer particles, nothing unusual immediately occurs. Shortly after mixing, however, a white precipitate forms. If the ratio of urea to molten paraffin wax is higher than about 1:1 the entire mass becomes a solid having about the texture of wet sand. In this case it is extremely difficult to even remove the solid mass from the mixing vessel. The solid precipitate is not merely a physical mixture of urea and paraffin wax because when it is separated and heated to 210° F. the wax component thereof, which has a melting point of 129° F., does not melt. Analysis of the precipitate indicates that it is a urea-paraffin wax adduct having a composition of about 76% urea-24% paraffin wax. The time required for adduction, i.e., for the formation of the white precipitate, varies somewhat but appears to depend mainly upon the urea particle size. When commercial crystal urea, which has a particle size of mainly larger than 100 mesh (all mesh sizes are by U.S. Standard Sieves) is used, adduction usually occurs in less than 15 minutes. When urea having a particle size of 100% through 400 mesh is used, adduction generally occurs in less than 5 minutes. In any event the adduction reaction often occurs before the dispersion of urea in molten paraffin wax can be shaped into small fertilizer particles.

The solid adduct itself has some slow release properties and has been disclosed and claimed in a copending application Serial No. 308,087, filed concurrently herewith. In fact, the water resistance of a urea-paraffin wax adduct is higher than the water resistance of a dispersion of urea in paraffin wax containing the same total amounts of urea and wax but in which the urea is in the unadducted form. Unfortunately, the water resistance of the adduct has sometimes been found to decrease very rapidly after prolonged contact with water. This decrease is an unpredictable phenomenon in that some batches of the adduct exhibit it while other, apparently identical, batches do not. Because of this erratic behavior it is often preferable that the slow release urea fertilizer be a dispersion of solid urea in solid paraffin wax rather than a urea-paraffin wax adduct. Where such is the case a method of preventing or at least postponing the adduction reaction is necessary in order that such reaction does not occur during the time the dispersion is being processed into small particles. We have found that if a small amount of rosin is incorporated into the paraffin wax, adduction thereof with urea does not occur. This solution is described in more detail subsequently under the heading, "Adduction."

The other processing difficulty mentioned previously arises when the fertilizer is urea or any other fertilizer compound such as those mentioned previously. It is pointed out hereafter that in a slow release fertilizer comprising a dispersion of fertilizer in wax. the amount of fertilizer will usually be a major amount, i.e., over 50%, more frequently 50–80%, and the amount of the wax phase will normally be a minor amount, i.e., less than 50%, more frequently 15–49%, by weight of the total composition. All percentages and parts herein are by weight. If a fertilizer having a particle size of, say, 80–100 mesh is dispersed in wax in the stated amounts the resulting mixture has a fluid appearance. Although the dispersion has a grainy texture because of the solid fertilizer present the dispersion is definitely fluid, i.e., it will take the shape of its container or can be poured from its container. However, if the same amounts of fertilizer and wax are used but the particle size of the urea is smaller than 120 mesh the resulting dispersion is no longer fluid, i.e., it is unflowable. The dispersion no longer can be poured from its container as it has a putty-like texture. Such a dispersion is difficult to shape into small particles because it cannot be pumped or otherwise readily handled. We have found that if in the preparation of the dispersion a small amount of asphalt is incorporated into the wax the final dispersion is fluid and can be poured, pumped, etc. This solution is described in detail subsequently under the heading, "Fluidization."

WATER RESISTANCE—ROSIN

According to the invention the water resistance of a slow release urea-wax fertilizer is substantially improved by incorporating rosin into the wax. A variety of types of rosin can be used to effect such improvement in water resistance and these suitable types of rosin will be described first after which experimental results showing the improvement in water resistance will be presented.

The term rosin encompasses three specific types of rosin; gum, wood, and tall oil rosin. Wood rosin is obtained from the stumps of dead pine trees while gum rosin is obtained from the oleoresin exuded by living pine trees. Tall oil rosin is separated from tall oil. Each type of rosin contains about 90% resin acids and about 10% nonacidic, neutral material. The acids present in the resin acid fraction are mainly diterpenoid monocarboxylic derivatives of alkylated hydrophenanthrenes. The acids present are generally classified into two main types, abietic type acids and pimaric type acids. Illustrative of the former type are abetic, levopimaric, palustric, and neoabietic acids, while examples of the pimaric type acids are dextropimaric acid and isodextropimaric acid.

Rosin has been used in a variety of applications. For some applications such as an ingredient in soldering flux, the rosin can be used as extracted from its natural source by conventional means. In this form rosin is conventionally referred to as unmodified rosin. For other applications, however, unmodified rosin is unsuitable because of its adherent acidity, because of its susceptibility to oxidation, or because of certain other undesirable physical properties. Most of the abietic type acids in unmodified rosin contain two conjugated double bonds and readily take up oxygen. Consequently when umodified rosin is exposed to air over a period of time, the exposed surfaces are oxidized and become considerably darker in color.

Most commercial rosin has been treated in one or more ways in order to reduce its acidity and/or to reduce its susceptibility to air oxidation and/or to improve other physical properties such as hardness, softening point, color, etc. The treatments effecting a reduction of acidity generally involve a reaction at the carboxylic acid group of the resin acids while treatments which improve the oxidation stability of rosin generally involve an alteration or removal of one or both of the conjugated double bonds of the abietic type acids containing same. Removal of one double bond causes a substantial improvement in oxidation stability while removal of the second causes a further but lesser improvement.

One method of treating rosin to improve its oxidation stability is hydrogenation to saturate either or both double bonds. Rosin so treated is known conventionally as hydrogenated rosin. Another such method is dehydrogenation to form a third double bond which through a disproportionation forms an aryl nucleus with the other two conjugated double bonds. Such rosin is conventionally known as disproportionated rosin. A still further method involves polymerization, the result of which treatment is the polymerization of a large part of the two double bond abietic type acids to produce a heterogeneous dimer. Simultaneously with the polymerization reaction some hydrogenation and disproportionation inevitably occur. Such rosin is known conventionally as polymerized rosin. Another treatment commonly employed which effects removal of one of the conjugated double bonds of the resin acids containing same is reaction with an unsaturated dibasic acid anhydride such as maleic anhydride. Maleic anhydride reacts with the levopimaric acid in rosin to form the well known levopimaric acid-maleic anhydride adduct which contains only one double bond. As the reaction proceeds other resin acids containing conjugated double bonds begin to isomerize to levopimaric acid which then reacts in the same way. Eventually all the conjugated double bond resin acids are converted to the adduct. Such a rosin is conventionally referred to as a maleic modified rosin. The maleic adduct can, if desired, be reacted with a polyhydric alcohol to form a type of alkyd resin conventionally known as a rosin modified alkyd resin or as an alkyd modified rosin such as a maleic modified alkyd modified rosin. Similarly a rosin modified phenolic resin is obtained by reacting a phenolic resin with rosin. In the course of the reaction one of the conjugated double bonds in the resin acids containing same is eliminated.

All of these methods of treating rosin are not equally effective. For example, both conjugated double bonds can be essentially completely removed by hydrogenation. On the other hand, polymerized rosin still usually contains about 10–15% abietic type acids having conjugated double bonds. Similarly the conversion in the dehydrogenation-disproportionation reaction is sometimes less than 100%.

In addition to these treatments to improve oxidation stability rosin is also treated, as mentioned previously, to reduce its acidity. One such method is to convert the resin acids to metal resinates. For example, calcium resinate, zinc resinate, and sodium resinate are prepared by reacting rosin with calcium hydroxide, zinc oxide, and sodium hydroxide respectively. In analogous manner salts of other metals such as manganese, aluminum, lead, etc. can also be prepared. Another method of reducing the acidity of rosin is by esterification with a monohydric alcohol such as methanol, ethanol, etc., or a polyhydric alcohol such as glycerol, pentaerythritol, ethylene glycol, etc, to form methyl ester of rosin, ethyl ester of rosin, glycerol ester of rosin, pentaerythritol ester of rosin, ethylene glycol ester of rosin, and the like. A further method of reducting the acidity of rosin is by ammoniation to convert the carboxylic acid group to a nitrile group which upon hydrogenation is converted to the corresponding amine group.

In many cases both the acidity and oxidation instability of rosin are undesirable properties and the rosin is therefore subjected to several treatments in order to improve both of these properties. Such combination treatments results in rosins such as hydrogenated zinc resinate, ethylene glycol ester of polymerized rosin, calcium salt of polymerized rosin, glycerol ester of maleic modified rosin, methyl ester of hydrogenated rosin, and the like.

The above and other methods of treating rosin are well known to those skilled in the art. Rosins so treated have long been articles of commerce, most treated rosins being used as ingredients in varnish. A detailed discussion of methods of treating rosin can be found in Kirk-Othmer, Encyclopedia of Chemical Technology, vol. 11, pp. 779–810 (1953) and also in Kappelmeier, Chemical Analysis of Resin Based Coating Materials, pp. 31–40 (1959).

As mentioned previously rosin as extracted in conventional manner from its natural source is known conventionally as unmodified rosin. It is so referred to herein.

In addition rosin which has been treated in various ways, most frequently to reduce its acidity or to improve its oxidation stability, is conventionally referred to as modified rosin, a rosin derivative, etc. For the present purpose rosin which has been treated by any of various treatments such as the methods described above, is defined as modified rosin. All modified rosins, as the term is used herein, contain the carbon-carbon skeleton which is present in the three condensed rings of the abietic type acids. Abietic acid, for example, has the following structure:

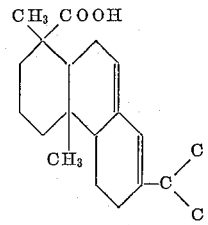

The other abietic type acids differ from abietic acid only in the quantity and position of the double bonds. All modified rosins contain a carbon-carbon skeleton the same as that of the three condensed rings in the above structure. Some modified rosins, such as polymerized rosin, contain more than one such skeleton. Other modified rosins such as a rosin modified phenol formaldehyde resin contain an additional ring condensed with the three rings in the structure above. In all cases, however, a modified rosin will contain at least one such skeleton. The term rosin includes, for the present purpose, both modified rosin and unmodified rosin. Where a single specific type of rosin or a specific group of rosins is meant it will be specifically stated, such as polymerized wood rosin, hydrogenated rosin, unmodified rosin, glycerol ester of unmodified gum rosin, maleic modified glycerol ester of unmodified rosin, etc.

The water resistance of a slow release fertilizer comprising a dispersion of urea in wax can be substantially improved by incorporating a small amount of rosin into the wax component of the dispersion. This is shown by the data contained in Table I which data show the results of water resistance tests on various slow release fertilizer compositions. Each composition is a dispersion of urea in wax. In all cases except one the wax contains rosin dissolved therein, the specific rosin being as indicated in the table. The compositions in which rosin is omitted are for control purposes, i.e., they permit determination of the effect of the rosin additive on the water resistance of the fertilizer. The wax used in each composition (and in all compositions described herein unless otherwise indicated) is a paraffin wax having a melting point of 129° F. (ASTM D–87), a penetration of 18 dmm. at 77° F., and 105 dmm. at 100° F. (ASTM D–1321, 100 g., 5 sec.) and a viscosity of 38.8 S.U.S. at 210° F. (ASTM D–446). In each case the composition is prepared by heating the wax to 250° F., adding the rosin to the molten wax and stirring until it dissolves therein, cooling the wax-rosin solution to 150° F., adding the urea, stirring until a uniform dispersion of urea in the wax phase is obtained, molding the dispersion into a plurality of particles having substantially the same shape and having a longest dimension of about 1/16–1/8 inch, and allowing the particles to cool to room temperature.

To determine the leaching properties of such a fertilizer an amount of fertilizer equivalent to 10 grams of urea is submerged in 100 grams of water at room temperature and without agitation. After a known period of submergence the water is withdrawn and analyzed for urea content. Knowing the amount of urea in the original sample and the amount of urea present in the withdrawn water, it is possible to calculate the percentage of urea remaining in the the sample after the known period of submergence. Water resistance determined in this manner is defined for the present purpose as being determined by submergence in water. As a modification of this procedure the water in which the sample is submerged is replaced with fresh water at a plurality of intervals after initial submergence and in each case the withdrawn water is analyzed for urea content. This procedure permits construction of a graph in which the percentage of urea remaining in the sample is plotted against submergence time.

Each composition in Table I contains 60% urea by weight of the total composition and 40% wax phase, the wax phase being wax plus rosin where rosin is used and wax alone where rosin is not used. Except for the control samples, in which the rosin is omitted, all compositions contain 5% rosin based on the total weight of the wax phase. All rosins specified in Table I are wood rosins.

*Table I*

| Composition | Type of Rosin | Percent Urea Remaining After 24 Hours Under Water |
| --- | --- | --- |
| 1 | None | 0 |
| 2 | Polymerized Rosin (Poly-Pale, Hercules Powder Co.). | 40 |
| 3 | Pentaerythritol Ester of Unmodified Rosin (Pentalyn A, Hercules Powder Co.). | 83 |
| 4 | Glycerol Ester of Polymerized Rosin (Poly-Pale Ester 10, Hercules Powder Co.). | 49 |
| 5 | Glycerol Ester of Unmodified Rosin (Ester Gum 8L, Hercules Powder Co.). | 67 |
| 6 | Calcium Salt of Polymerized Rosin: | |
| | (a) Calcium Content, 5% (Limed Poly-Pale, Hercules Powder Co.). | 62 |
| | (b) Calcium Content, 6% (Limed Poly-Pale, Hercules Powder Co.). | 70 |
| | (c) Calcium Content, 8% (HM Limed Poly-Pale, Hercules Powder Co.). | 80 |
| 7 | Hydrogenated Rosin (Staybelite, Hercules Powder Co.). | 50 |
| 8 | Glycerol Ester of Hydrogenated Rosin (Staybelite Ester 10, Hercules Powder Co.). | 45 |
| 9 | Maleic Alkyd Modified Glycerol Ester of Unmodified Rosin (Lewisol 28, Hercules Powder Co.). | 70 |
| 10 | Unmodified Rosin (K Wood Rosin, Hercules Powder Co.). | 90 |
| 11 | Pentaerythritol Ester of Polymerized Rosin (Pentalyn C, Hercules Powder Co.). | 65 |
| 12 | Maleic Modified Pentaerythritol Ester of Unmodified Rosin (Pentalyn G, Hercules Powder Co.). | 62 |

It is evident from the data contained in Table I that a substantial improvement in the fertilizer water resistance has been effected by incorporating the specified rosin into the wax. Substantial improvements are also obtained when other rosins are used.

The improvement in water resistance obtained by the use of rosin is not dependent upon the use of any specific ratio of urea to wax phase. The data in Table II show the water resistance of compositions containing 70% urea–30% wax phase. The compositions contain 0, 5, and 10% polymerized wood rosin. The compositions are made in substantially the same manner as those in Table I except that in preparing the compositions of Table II the dispersion of urea in molten wax phase is formed into cylindrical particles having a diameter of one-half inch and a length of one-half inch. The particles are therefore larger than those of Table I. Larger particles tend to have higher water resistance during the first 20–30 hours of submergence than smaller particles due to the difference in surface area. Furthermore, the particle size of the urea used in the compositions of Table I was about 200 mesh while in the Table II compositions it was 60–100 mesh. Larger particle size urea tends to reduce the water resistance. On the other hand, the effect of rosin can be determined from compositions having particles of any size and using urea of any particle size so long as the particles of each composition being compared are substantially the same size. For this reason the various compositions of Table I can be compared with each other, the various compositions of Table II can be compared with each other, but the compositions of Table I should not be compared with the compositions of Table II. Similarly, throughout this disclosure compositions within a particular table can be compared with each other but are not necessarily comparable with compositions of other tables unless so stated.

*Table II*

| Composition | Rosin | Percent Urea Remaining After 3 Hours Under Water |
| --- | --- | --- |
| 1 | None | 27 |
| 2 | 5% Polymerized Wood Rosin | 47 |
| 3 | 10% Polymerized Wood Rosin | 53 |

It can be seen from the data in Table II that a substantial improvement in water resistance is obtained by incorporating rosin in a urea-wax fertilizer containing 70% urea.

It has also been unexpectedly found that if certain types of rosin are partially oxidized before being incorporated into the wax component of the fertilizer, a superior improvement in water resistance is obtained. By way of example, urea dispersed in wax-polymerized wood rosin has a higher water resistance than urea dispersed in wax alone. However, urea dispersed in wax-partially oxidized polymerized wood rosin has a still higher water resistance. Two important aspects of this partial oxidation should be noted. One, the improvement in fertilizer water resistance due to partial oxidation of the rosin component thereof is obtained with only certain types of rosin. With some rosins partial oxidation thereof effects no improvement in the fertilizer water resistance. Secondly, the oxidation of the rosin must be partial oxidation to a relatively small degree, in other words limited oxidation. If oxidized excessively the rosin is no better than when not oxidized at all.

The rosins which can be improved by partial oxidation are wood rosins and are polymerized and hydrogenated rosin, mono and polyhydric alcohol esters of unmodified, polymerized, and hydrogenated rosin, and polyvalent metal salts of unmodified, polymerized, and hydrogenated rosin. The proper degree of oxidation is described subsequently.

The data in Table III below show the improvement in fertilizer water resistance due to the partial oxidation of the rosin present therein. Each composition contains 60% urea–40% wax phase and in each case the wax phase contains 5% of the rosin specified. All rosins are wood rosins. Each specified rosin is used in both the unoxidized and partially oxidized form. In each case the wax phase also contained 5% asphalt. The purpose of the asphalt is described in more detail hereafter but it does not influence the determination of the effect of partial oxidation of the rosin since the asphalt is present in all compositions, i.e., in both the unoxidized and partially oxidized rosin compositions. Each composition is prepared in the same manner as described in conjunction with Table I. Where the specified rosin is oxidized this is accomplished by breaking up the rosin into small pieces, screening out a 10–20 mesh fraction, spreading the fraction in a thin layer on a tray and placing the tray in an oven maintained at 140° F. Fresh air is circulated very mildly through the oven in order to insure constant conditions. The pressure within the oven is essentially atmospheric. The rosin is periodically stirred to insure that all the rosin is equally oxidized and the rosin is left in the oven for 3 days.

Table III

| Composition | Type of Rosin | Rosin Condition | Percent Urea Remaining After 72 Hours Under Water |
|---|---|---|---|
| 1 | Polymerized Rosin | Oxidized / Unoxidized | 95 / 20 |
| 2 | Calcium Salt of Polymerized Rosin: | | |
|   | (a) 5% Calcium | Oxidized / Unoxidized | 90 / 46 |
|   | (b) 6% Calcium | Oxidized / Unoxidized | 78 / 66 |
|   | (c) 8% Calcium | Oxidized / Unoxidized | 84 / 70 |
| 3 | Glycerol Ester of Unmodified Rosin | Oxidized / Unoxidized | 78 / 45 |
| 4 | Glycerol Ester of Hydrogenated Rosin | Oxidized / Unoxidized | 63 / 30 |
| 5 | Glycerol Ester of Polymerized Rosin | Oxidized / Unoxidized | 76 / 40 |
| 6 | Pentaerythritol Ester of Polymerized Rosin | Oxidized / Unoxidized | 52 / 36 |
| 7 | Pentaerythritol Ester of Unmodified Rosin | Oxidized / Unoxidized | 75 / 60 |

It is apparent from the data in Table III that for the types of rosin specified in Table II partial oxidation thereof effects a significant improvement in the water resistance of the resulting fertilizer. Significant improvements are also obtained when the other specified types of rosin are partially oxidized. As previously mentioned not all types of rosin can be significantly improved by partial oxidation thereof. This is shown by the data contained in Table IV which show the water resistance of several compositions containing other types of rosin. The compositions in Table IV are identical to those in Table III in every respect except for the type of wood rosin.

Table IV

| Composition | Type of Rosin | Rosin Condition | Percent Urea Remaining After 72 Hours Under Water |
|---|---|---|---|
| 1 | Maleic Modified Pentaerythritol Ester of Unmodified Rosin | Oxidized / Unoxidized | 46 / 46 |
| 2 | Maleic Alkyd Modified Glycerol Ester of Unmodified Rosin | Oxidized / Unoxidized | 61 / 60 |
| 3 | Unmodified Rosin | Oxidized / Unoxidized | 70 / 70 |

It was stated in connection with Table III that the presence of asphalt in the compositions was immaterial with respect to the improvement due to partial oxidation of the rosin. In other words the improvement due to rosin oxidation is obtained whether asphalt is present or not. The data in Table V show the water resistance of compositions containing no asphalt. Each composition contains 70% urea-30% wax phase and the wax phase is 95% wax-5% polymerized wood rosin unoxidized in one composition and oxidized to a limited extent in the other (3 days at 140° F.). The fertilizer particles are prepared in the same manner as those of Table II.

Table V

| Composition | Type of Rosin | Rosin Condition | Percent Urea Remaining After 72 Hours Under Water |
|---|---|---|---|
| 1 | Polymerized Rosin | Oxidized / Unoxidized | 77 / 47 |

As mentioned previously the amount of oxidation is important in obtaining the improvement in water resistance. The oxidation must be partial. Over oxidation is equivalent to no oxidation. This is shown by the graph of FIGURE 1 which is a plot of fertilizer water resistance versus days of oxidation at 140° F. The compositions represented by the graph each contain 65% urea-35% wax phase and the wax phase in each is 90% wax-10% polymerized wood rosin. The rosin is oxidized, in the same manner as described in conjunction with Table III, for varying periods of 0–9 days. The fertilizer particles and the urea particles therein are the same size as in the compositions which are the subject of Table V.

It is apparent from FIGURE 1 that oxidation for 1 day improves the fertilizer water resistance. Longer oxidation results in further improvements up to an oxidation time of 3 days. Beyond a 3 day oxidation period the water resistance decreases until finally at 9 days oxidation the water resistance is about the same as with no oxidation. Although an oxidation period of about 3 days effects maximum improvement in water resistance it should be noticed that oxidation times as low as 1 day or as high as 8 days result in a substantial water resistance improvement. Thus for a 1 day oxidation there is 100% more urea remaining than when the rosin is not oxidized at all. Similarly the water resistance is about 160% better at 8 days oxidation than at no oxidation. Oxidation of the other specified rosins gives analagous results, i.e., the water resistance of the fertilizer is improved by oxidation of the rosin at 140° F. for 1–8 days.

Although the above examples have illustrated the use of rosin partially oxidized at 140° F. it is not necessary that the oxidation temperature be 140° F. for other temperatures can also be used with substantially the same beneficial effectiveness. FIGURE 2 illustrates the improvement in water resistance effected by oxidizing the rosin at 110° F. for varying periods of time. The compositions upon which the graph of FIGURE 2 are based all contain 60% urea–40% wax phase. In all cases the wax phase is 90% wax-5% polymerized wood rosin-5% asphalt. The rosin is oxidized in the same manner as before except that the oxidation temperature is 110° F. rather than 140° F.

Certain differences and similarities between oxidation of the rosin at 110° F. and 140° F. are readily apparent from FIGURES 1 and 2. The curves are similar in that partial oxidation at either temperature effects a distinct improvement in fertilizer water resistance. The curves are dissimilar in that once the improved water resistance is achieved by oxidation at 110° F. further treatment at 110° F. does not reduce the water resistance. This may seem inconsistent to the results at 140° F. oxidation. The reason for this difference due to oxidation temperature is not known with certainty. It is believed, however, that the oxidation product, highly desirable from a water resistance standpoint is the same at both 110° F. and 140° F., but that the oxidation product is unstable at 140° F. and decomposes to another product which from a water resistance standpoint is not much better than the unoxidized rosin.

One method of characterizing the oxidized rosins which give the superior results of the invention is in terms of the difference in oxygen content of the initial rosin and the oxygen content of the oxidized product. This, however, is impractical for several reasons. One, the increase in weight is very small. Thus, in the rosin used to prepare the graph of FIGURE 1, the initial rosin oxygen content was 10% (theoretical=10.2) while after nine days oxidation the rosin oxygen content was 11.8%, with the oxygen content after 3 days oxidation being 11%. Secondly, for the rosins which can be improved my partial oxidation the increase in weight at maximum improvement is not the same for every such rosin, but varies depending upon the molecular weight of the starting material. For these reasons it is preferred to define the increase in oxygen content in terms of days of oxidation at 140° F. As is illustrated by FIGURE 1 the days of oxidation over which the improvement in fertilizer water resistance occurs is relatively large, i.e., 9 days; hence the identification of the optimum oxidation point can be specified more accurately. Furthermore, oxidation of the other specified rosins for 1–8 days at 140° F. also produces significant improvements in fertilizer water resistance. The graph of FIGURE 1 shows that the optimum increase in oxygen content for polymerized wood rosin is the increase which is equivalent to the increase obtained by heating the rosin at 140° F. at atmospheric pressure and in the presence of air for 3 days. Indeed when a variety of commercial polymerized wood rosins are oxidized for varying periods of 1 to 9 days under the above conditions, the oxygen content at the 3-day oxidation point varies slightly from one rosin to another but the optimum water resistance is obtained with those polymerized rosins which had been oxidized 3 days. For the other specified types of rosin which can be improved by partial oxidation the optimum increase in oxygen content in terms of days oxidation at 140° F. will vary slightly from one type to another but is usually in the range of 2–5 days.

In summary, then, for the types of rosin specified the oxidation should be equivalent to that obtained by oxidizing the rosin at atmospheric pressure, in the presence of air, and at 140° F. for a period of 1–8 days, preferably 2–6 days. In all cases of course the oxidation should be sufficient to improve the water resistance of the fertilizer composition as determined by submergence in water for 72 hours. As pointed out, the oxidation does not always have to be carried out at 140° F., i.e., once the optimum oxygen content at 140° F. is established the oxidation of subsequent batches of rosin can be effected under any conditions desired so long as the oxidation is stopped at the oxygen content corresponding to the optimum oxygen content at 140° F. As can be seen from FIGURE 2 the oxidation can be successfully effected at 110° F. Other temperatures can likewise be used. There are, however, certain reasons why it is preferred to actually carry out the oxidation at about 140° F. If the oxidation is carried out at 110° F. the final fertilizer composition sometimes tends to be slightly unstable in that the water resistance of the fertilizer several months after preparation may be slightly lower than the water resistance immediately after preparation. Although such decrease is small, it is reduced by employing a higher oxidation temperature. If the oxidation temperature is 140° F. this deterioration on aging is essentially eliminated. If the oxidation temperature is much over 140° F., the rosin sometimes becomes somewhat tacky with the rosin particles exhibiting a tendency to stick together. This may cause difficulty in subsequent handling of the rosin. Secondly, as the oxidation temperature increases much over 140° F. the rate of oxidation increases and it may be more difficult to stop the oxidation at the desired point.

The foregoing description has shown that incorporation of rosin, either modified or unmodified, into the wax component of a urea-wax slow release fertilizer improves the water resistance of such fertilizer. Although all types of rosin effect this result some types of rosin are preferred for one or more reasons. One group of preferred rosins is preferred because any rosin in this group results in a fertilizer which is extremely adaptable for actual commercial use. Appreciation of this factor depends upon an understanding of the desired characteristics of a slow release fertilizer containing a source of nitrogen in relation to the specific crop being grown. The ideal slow release fertilizer would release nitrogen from the fertilizer to the plant over the entire growing season of the crop which for many crops, e.g., snap beans, is on the order of 30–50 days. In addition, it would release nitrogen to the plant at exactly the rate at which the crop consumes nitrogen in its normal growing season. The nitrogen uptake of most crops is usually not uniform over the entire growing season but varies somewhat throughout the growing season. Finally the fertilizer must possess these properties when in the form of small discrete particles not larger than about 1/16 inch.

Unfortunately, such an ideal slow release fertilizer has not yet been found. However, certain rosins permit the preparation of urea-wax compositions which are a distinctly closer approximation to such an ideal slow release fertilizer than has been known heretofore. While all rosins improve the water resistance of a slow release fertilizer containing urea and wax so that a urea-wax-rosin composition is vastly better suited as a slow release fertilizer than a urea-wax composition, two particular rosins are particularly desirable. Compositions containing either of these rosins can be prepared which will, when placed in the soil, release nitrogen at a substantially uniform rate over a period of 30–50 days.

These two particularly desirable rosins are partially oxidized polymerized wood rosin and partially oxidized calcium salt of polymerized wood rosin containing (before oxidation) 7–10% calcium. The particular suitability of these rosins is shown by the data contained in Table VI which shows the water resistance of compositions containing each of these rosins. All compositions contain 57% urea and 43% wax phase. The wax phase in all cases is 90% wax, 5% asphalt, and 5% rosin of the type specified. The rosins are oxidized for 3 days at 140° F. in the manner previously described. The fertilizer was prepared in substantially the same manner as before, the final particles being substantially spherical in shape and having a diameter of about 1/16 inch and the urea component being about 200 mesh.

*Table VI*

| Composition | Rosin | Percent Urea Remaining After Stated Days Under Water | | | | | | |
|---|---|---|---|---|---|---|---|---|
| | | 0 | 5 | 10 | 20 | 30 | 40 | 50 |
| 1 | Partially Oxidized Polymerized Wood Rosin. | 100 | 85 | 82 | 64 | 42 | 30 | 18 |
| 2 | Partially Oxidized Calcium Salt of Polymerized Wood Rosin-8% Calcium. | 100 | 75 | 58 | 44 | 36 | 31 | 25 |

It is apparent from the data in Table VI that the use of either of the two preferred rosins results in a fertilizer having an extremely long life. It will be recognized, of course, that the rate of nitrogen release as presented in Table VI is determined by submerging the fertilizer particles in water. This of course is not identical to the conditions existing in the soil in which the fertilizer is placed. We have found, however, by actual tests on such crops as tomatoes, snap beans, tobacco, grass, etc., that the rate of nitrogen release when the particles are submerged in water can be used to correctly predict the performance of the fertilizer in soil. The general shape of the graphs obtained by plotting the percent urea remaining versus time will be substantially the same in each case. Although the shape of each graph will be substantially the same, the fertilizer usually releases nitrogen in the soil slightly faster than would be indicated by the water submergence test. Allowance for this difference can be readily made, however, by adjusting the ratio of urea to wax phase in the fertilizer. This aspect is more fully discussed hereinafter.

The preferred rosins listed in Table VI have been adequately described heretofore. Except for the partial oxidation they are well known products which are articles of commerce and which can also be made by known methods. For example, polymerized wood rosin is a solid prepared by the action of alkyl halides, metal halides, or inorganic acids on unmodified wood rosin at about room temperature and over an extended period of time. This treatment effects the polymerization of a large part of the two double bond abietic type acids to produce a heterogeneous dimer. During the course of the reaction some hydrogenation and disproportionation usually occur. The composition of the polymerized wood rosin is usually about 50% monomeric products, 40% dimeric products, and about 10% neutral products. The 50% monomeric products usually consist of about 10–15% (by weight of the total product) abietic type acids having conjugated double bonds and about 35–40% other acids free of conjugated unsaturation such as dihydro, dehydro, and tetrahydroabietic acids. The neutral bodies in the polymerized rosin are much the same as those in the starting material.

The calcium salt of polymerized wood rosin is readily prepared by reacting lime with the polymerized wood rosin. It is important, however, that the proper amount of lime be used. It is readily apparent from the data contained in Table III—Composition 2 that the calcium content has a considerable influence upon the water resistance of the ultimate fertilizer. A calcium content of 5% indicates that a portion of the acids in the polymerized wood rosin have not been converted to the salt form. Such a product usually has an acid number of about 80. As the calcium content increases this portion decreases. At a calcium content of 7–10% most of the acids have been converted to salt form and the acid number of such a product is usually about 20.

Another group of rosins which are preferred for the purpose of improving the water resistance of the fertilizer are the remaining rosins which can be improved by partial oxidation. More preferably, they are utilized in the partially oxidized form. These rosins are hydrogenated rosins, the mono and polyhydric alcohol esters of unmodified, polymerized, and hydrogenated rosin, and polyvalent metal salts of unmodified polymerized, and hydrogenated rosin. Of the mono and polyhydric alcohol esters mentioned the latter are preferred and preferably the ester is of a polyhydric alcohol containing 2–6 carbon atoms. Where a monohydric alcohol ester is employed it is preferably the methyl or ethyl ester. The polyvalent metal salts mentioned are preferably salts of calcium, zinc, or manganese, and preferably they are metal salts of polymerized rosin.

In describing the use of rosin to improve the water resistance of the fertilizer the rosin has been referred to as being incorporated in, added to, or dissolved in the wax. These terms are considered to be equivalent. While it may not be technically correct to refer to the rosin as being "dissolved" in the wax in the technical sense of the word "dissolve," when a mixture of wax and rosin is stirred at elevated temperature a substantially homogeneous phase results which has the appearance of a solution. Consequently the rosin is referred to as being dissolved in the wax. Infrequently when the rosin and wax are mixed at elevated temperature a small amount of rosin, less than 5%, remains undissolved and will settle to the bottom of the mixing vessel. This small amount of residue can be disregarded for it does not detract from the ability of the dissolved rosin to improve the fertilizer water resistance. Such a residue is, of course, not to be considered as being dissolved in, incorporated in, or added to the wax.

The types of wax which can be used in the compositions of the invention are paraffin wax and microcrystalline wax. The term paraffin wax and microcrystalline wax are used herein in accordance with their conventional meanings. Both types of waxes are obtained only from petroleum. Moreover, they are the only types of wax obtainable from petroleum, hence they are referred to generically as petroleum wax. Their differences and similarities are well known to those skilled in the art and are summarized in Bennett, Commercial Waxes, Chemical Publishing Co. (1950), pp. 84–88. Both paraffin and microcrystalline waxes contain mainly saturated paraffin hydrocarbons, the former containing mainly straight chain paraffins while the latter contains a substantial amount of branch chain paraffins. Some typical properties of paraffin and microcrystalline waxes are as follows.

| Property | Paraffin Wax | Microcrystalline Wax |
| --- | --- | --- |
| Molecular Weight | 250–500 | 500–800 |
| Melting Point, ° F. (ASTM D–127) | 110–165 | 140–210 |
| Viscosity at 210° F., S.U.S. (ASTM D–446) | 30–50 | 60–100 |
| Penetration at 77° F., dmm. (ASTM D–1321: 100 g., 5 sec.) | 5–25 | 5–25 |

It is apparent from the data shown above that some of the physical properties of the paraffin waxes overlap the normal range of the same property in the microcrystalline waxes. The property which can be used, as is well known, to distinguish paraffin wax from microcrystalline wax is the type of crystals present in each. Paraffin wax has large well-formed crystals while microcrystalline wax contains small irregular crystals and no well-formed crystals of any size. Indeed, microcrystalline wax is sometimes referred to as amorphous.

In preparing the compositions of the invention now being discussed a paraffin wax is preferred. Such a wax, or a microcrystalline wax where same is used, preferably has a melting point, viscosity, and penetration within the appropriate ranges shown above.

The prior description has shown how the addition of rosin to the wax phase of a slow release urea-wax fertilizer improves the water resistance thereof. With respect to water resistance the invention is limited to fertilizers containing urea because the use of rosin effects no improvement in water resistance when fertilizers other than urea are used. For example, when a non-nitrogen fertilizer such as potassium chloride, or a nitrogen fertilizer such as diammonium phosphate or ammonium nitrate is dispersed in wax-rosin, the water resistance of the fertilizer is essentially the same as when the fertilizer is dispersed in wax alone. The data contained in Table VII show the effect of adding polymerized wood rosin to the wax phase of a dispersion of ammonium nitrate in wax. Each composition contains 57% ammonium nitrate and 43% wax phase. In Composition 1 the wax phase is 100% wax while in Composition 2 the wax phase is 90% wax-10% polymerized wood rosin. This amount of rosin is, as shown previously, enough to substantially improve the water resistance of a urea fertilizer. The compositions were prepared in substantially the same manner as the urea fertilizers previously mentioned except that the ammonium nitrate was dispersed in the wax at 170° F. rather than 240°–250° F. as a safety precaution in view of the well known explosive characteristics of ammonium nitrate which are made even worse by the presence of wax.

*Table VII*

[Ammonium nitrate fertilizer]

Composition: Percent ammonium nitrate remaining after 11 hours under water
1 (No rosin) _____ 31
2 (10% rosin) _____ 32

It is evident from the data that the use of rosin effects essentially no improvement in the water resistance of an ammonium nitrate-wax slow release fertilizer. Similarly with potassium chloride rosin effects no improvement as can be seen from the data of Table VIII. The compositions of Table VIII each contain 65% potassium chloride-35% wax phase. In Composition 1 the wax phase is 100% wax while in Composition 2 the wax phase is 95% wax-5% partially oxidized (3 days at 140° F.) polymerized wood rosin.

Table VIII

[Potassium chloride fertilizer]

| Composition | Percent Potassium Chloride Remaining After Stated Hours Under Water | |
|---|---|---|
|  | 96 Hours | 336 Hours |
| 1 (No Rosin) | 98 | 90 |
| 2 (5% Rosin) | 95 | 77 |

Again it is evident that the incorporation of rosin in the wax phase of a potassium chloride-wax slow release fertilizer serves no beneficial purpose. That the present invention is unique to a urea fertilizer is still further illustrated by the data contained in Table IX which shows the results obtained by incorporating rosin into the wax phase of a diammonium phosphate-wax slow release fertilizer. Each composition in Table IX contains 60% diammonium phosphate-40% wax phase. Composition 1 contains no rosin while Composition 2 contains 5% partially oxidized (3 days at 140° F.) polymerized wood rosin.

Table IX

Composition: Percent diammonium phosphate remaining after 48 hours under water
1 (No rosin) _____ 98
2 (5% rosin) _____ 77

Clearly no improvement in water resistance is obtained by dissolving rosin in the wax coating of the diammonium phosphate-wax slow release fertilizer. The rosin is, in fact, detrimental.

A lack of benefit is also found when rosin is added to the wax phase of a potassium sulfate-wax slow release fertilizer. The data in Table X shows the water resistance of a fertilizer containing 75% $K_2SO_4$-25% wax phase, the wax phase being 100% wax in one case and 90% wax-10% partially oxidized (3 days at 140° F.) polymerized wood rosin.

Table X

| Composition | Percent Potassium Sulfate Remaining After Stated Hours Under Water | |
|---|---|---|
|  | 96 Hours | 336 Hours |
| 1 (No Rosin) | 2 | 10 |
| 2 (10% Rosin) | 2 | 10 |

It is evident that the rosin imparts no benefit to the composition. When other rosins are evaluated in the wax phase of a slow release non-urea fertilizer the same results are found, i.e., rosin fails to effect any improvement in water resistance.

Even in the case of a urea fertilizer improved water resistance is obtained only when the amount of rosin employed is maintained within a relatively narrow range. This is brought out more clearly in the discussion next following.

The amount of each ingredient in the compositions of the invention is best understood by visualizing the compositions as a urea component and as a wax phase, the latter being wax and rosin. Considering first the wax phase the amount of rosin should be a minor amount, i.e., less than 50%, based on the wax phase. As rosin is initially added to the wax phase the fertilizer water resistance increases. As more rosin is added further increases are obtained up to about 5-20% rosin, at which point the water resistance begins to decrease. As further quantities of rosin are added the water resistance decreases rapidly. This dependence of the water resistance upon rosin content is more readily appreciated by examination of FIGURE 3 which shows the water resistance of a fertilizer containing 57% urea-43% wax phase, the wax phase containing varying amounts of polymerized wood rosin. Similar results are obtained with other types of rosin, maximum improvement in water resistance usually being obtained at a rosin content of 5-25%. Within this range the amount of rosin which effects maximum improvement depends on the type of rosin. It has been shown heretofore that some rosins, such as partially oxidized polymerized wood rosin are inherently more effective than others from a water resistance standpoint. Within the 5-25% range as the inherent effectiveness of the rosin increases its optimum amount decreases. As stated, the amount of rosin employed in the compositions of the invention should be a minor amount based on the wax phase. In most cases the amount of rosin will be 2-35% although preferably the amount is 2-25%, more preferably 3-20%. In many cases it will not be necessary to use more than 10% rosin. The rosin should, obviously, be used in an amount sufficient to improve the fertilizer water resistance.

The relative amounts of the urea component and the wax phase will depend both upon the type of fertilizer being prepared, i.e., whether the final slow release fertilizer is to contain only a source of nitrogen or whether it is to contain sources of other essential elements such as in a complete fertilizer, and also upon the soil and climatic conditions in the location where the fertilizer will actually be used. For any fertilizer, complete or otherwise, the relative ratio of urea to wax phase can be varied to provide the specific rate of nitrogen release desired. As the amount of the wax phase in the fertilizer increases the water resistance of the fertilizer increases and, conversely, as the amount of wax phase decreases, the fertilizer water resistance decreases. In areas of heavy rainfall it will usually be desirable to employ a fertilizer having a relatively high wax phase content while in relatively dry areas the fertilizer will normally have a relatively low wax content. Although any desired ratio of urea to wax phase can be employed, in the case of a nitrogen fertilizer the amount of urea will normally be a major amount, i.e., over 50%, and the amount of wax phase will normally be a minor amount, i.e., less than 50%. In most cases a slow release nitrogen fertilizer will contain 50-80% urea, more frequently 50-70%, and 15-49% wax phase, more frequently 25-49%. Since it is a nitrogen fertilizer the urea will normally be the only fertilizer material in the composition although it may be desirable in some cases to include a bacteriacide, herbicide, or the like.

As was pointed out above the water resistance of the fertilizer can be varied by varying the relative ratio of urea to wax phase. The water resistance can also be varied by varying the amount of rosin, within the previously specified range of rosin content. This is evident from FIGURE 3 and also by the data contained in Table XI which shows the water resistance of a urea-wax slow release fertilizer having various amounts of rosin dissolved in the wax. Each composition in Table XI contains 57% urea-43% wax phase, the wax phase containing the stated amount of partially oxidized (3 days at 140° F.) polymerized wood rosin dissolved therein.

Table XI

| Composition | Rosin, Percent | Percent Urea Remaining After 24 Hours Under Water |
|---|---|---|
| 1 | 0 | 0 |
| 2 | 1 | 57 |
| 3 | 2 | 70 |
| 4 | 3 | 80 |
| 5 | 5 | 95 |
| 6 | 10 | 95 |

It is clear from the data of Table XI that the amount of rosin can be varied as a means of varying the water resistance of the final fertilizer. In most cases, however, it will be preferable to employ that amount of rosin which optimizes the water resistance of the wax phase irrespective of the urea to wax phase ratio, and then adjust the ratio of urea and wax phase to obtain the desired fertilizer water resistance. This approach minimizes the amount of rosin in the final composition, this being desirable since the rosin is usually the most expensive ingredient in the composition.

The composition of a slow release fertilizer containing more than one essential ingredient, such as a slow release complete fertilizer, is best understood in light of traditional requirements of the fertilizer consuming public. It has already been pointed out that the ability of rosin to improve the water resistance of a dispersion of a fertilizer in wax is unique to urea. The water resistance of a dispersion of potassium chloride and diammonium phosphate, for example, in wax is not improved, by adding rosin to the wax. In fact, fertilizers other than urea can usually be adequately waterproofed by the use of wax alone. In view of this, one method of preparing a slow release complete fertilizer would be to separately form a slow release urea fertilizer by dispersing urea in wax-rosin, a slow release phosphorus fertilizer by dispersing a phosphorus compound in wax, and then mixing the particles of each of three slow release fertilizers in the desired ratio. While this approach would appear to be satisfactory, consumer evaluation tests of our fertilizers have proven otherwise. Fertilizer consumers traditionally desire every particle of a slow release fertilizer to be identical, i.e., in a complete slow release fertilizer each particle should contain all three essential elements rather than some particles containing nitrogen, some potassium, and some phosphorus. Whether this lack of interest in a composition containing separate particles of each essential element is based upon a fear of possible segregation of the particles in storage and transit, inabiilty to uniformly apply the particles to the soil, etc., the dictates of the fertilizer consumers have to be met.

The only method of meeting this traditional requirement is to disperse the urea and the other elements desired in wax-rosin. Although the rosin is not necessary for the other elements, if each particle of the final composition must contain all the fertilizer ingredients used this is the only solution available, for it is impossible to have, in a single uniform particle, urea dispersed in wax-rosin and potassium chloride, for example, dispersed in wax alone.

While this solution means that the fertilizer manufacturer will use more rosin than is necessary, since some rosin will be in wax in which ingredients other than urea are dispersed, it does have advantages to the manufacturer. It permits him to prepare the complete product at a single time. He does not need to have facilities for blending various particles of several types of fertilizer particles. Similarly, he does not need to either have separate equipment lines to prepare the fertilizers separately or alternate a single equipment line from one fertilizer product to another.

With the above background in mind, a slow release fertilizer containing a plurality of essential elements will normally contain a major amount of total fertilizer ingredients, usually 50–80%, more frequently 50–70%, and a minor amount of wax phase, but the amount of urea in the composition will usually be a minor amount of the total composition, although higher amounts of urea can also be used. For example, a slow release 10–10–10 complete fertilizer might contain the following:

|  | Percent |
|---|---|
| Urea | 21.4 |
| Triple superphosphate | 21.7 |
| Potassium chloride | 16.7 |
|  | 59.8 |
| Wax phase | 40.2 |
|  | 100.0 |

Similarly a slow release 5–15–10 complete fertilizer might contain

|  | Percent |
|---|---|
| Urea | 10.7 |
| Triple superphosphate | 32.6 |
| Potassium sulfate | 18.5 |
|  | 61.8 |
| Wax phase | 38.2 |
|  | 100.0 |

A 20–10–15 slow release complete fertilizer might contain

|  | Percent |
|---|---|
| Urea | 43.0 |
| Triple superphosphate | 21.7 |
| Potassium chloride | 8.3 |
|  | 73.0 |
| Wax phase | 27.0 |
|  | 100.0 | or, alternatively,

|  | Percent |
|---|---|
| Urea | 39.8 |
| Diammonium phosphate | 6.4 |
| Triple superphosphate | 14.3 |
| Potassium chloride | 8.3 |
|  | 68.8 |
| Wax phase | 31.2 |
|  | 100.0 |

In a slow release fertilizer containing a plurality of essential elements the amount of urea will normally be a minor amount, i.e., less than 50% of the total composition. Usually the amount of urea will be 5–50% although preferably the amount of urea is at least 10%, more preferably at least 20%. The amount of the wax phase will still normally be a minor amount, based on the total composition. Usually the amount of wax phase will be 15–49%, more frequently 25–49%.

Thus considering both the slow release nitrogen fertilizer and a slow release fertilizer containing a plurality of essential elements the amount of urea and wax phase will usually be 5–80 parts urea and 15–49 parts wax phase, more frequently 10–70 parts urea and 25–49 parts wax phase. More preferably the amount of urea is 20–70 parts and the amount of wax phase is 25–49 parts.

The manner in which the slow release fertilizer compositions of the invention can be made has been described heretofore. The following examples specifically illustrate same.

EXAMPLE I

Into a mixing tank equipped with heating means and an agitator is charged 31.5 parts paraffin wax having a melting point of 129° F. The wax is heated to 240° F. at which temperature 3.5 parts polymerized wood rosin which had been oxidized in the presence of air at atmospheric pressure for 3 days at 140° F. is charged to the tank. The mixture is stirred until the rosin dissolves in the wax, after which the wax-rosin mixture is cooled to 150° F. Next 65 parts of commercial crystal urea is charged to the tank and the contents of the tank then are stirred until the urea is uniformly dispersed in the wax phase. The dispersion of urea in the molten wax phase is then charged to a pellet mold where it is formed into small particles. The particles are allowed to cool to room temperature after which they are removed from the mold. The particles are a dispersion of solid urea in solid wax, the wax having rosin dissolved therein. The particles contain 65% urea-35% wax phase. The wax phase is 90% wax-10% rosin.

EXAMPLE II

The procedure is the same as in Example I except that the amount of wax is 38.2 parts and the amount of rosin is 2.0 parts. Furthermore, rather than charging 65 parts urea, a mixture containing 21.4 parts urea, 21.7 parts triple superphosphate, and 16.7 parts potassium chloride are charged to the molten wax phase. The particles removed from the pellet mold are a slow release 10-10-10 complete fertilizer containing 59.8% fertilizer ingredients and 40.2% wax phase, the wax phase is 95% wax-5% rosin. The amount of urea in the total composition is 21.4%.

WATER RESISTANCE—ASPHALT

According to this embodiment of the invention, the water resistance of a slow release fertilizer which comprises a dispersion of urea in wax, the wax having rosin dissolved therein, is further improved by dissolving asphalt in the wax-rosin phase. It is essential that rosin be present in the wax phase because if not present the use of asphalt actually decreases the fertilizer water resistance. Furthermore, it is essential that the amount of asphalt used be a relatively small amount, because relatively large amounts of asphalt decrease rather than increase the water resistance of the resulting fertilizer. These latter points are brought out in more detail subsequently.

The improvement obtained by adding asphalt to the wax-rosin phase is shown by the data contained in Table XII. The data show the water resistance of various urea-wax-rosin compositions with and without asphalt. The particular type of rosin is as specified in the table. Each composition contains 60% urea-40% wax phase. The wax phase contains, where no asphalt is used, 95% wax-5% rosin and, where asphalt is used, 90% wax-5% rosin-5% asphalt. The asphalt used was an oxidized (by air blowing) petroleum asphalt having the following properties.

Specific gravity at 77° F. _____ 1.05
Penetration at 77° F. (ASTM D5-47, 100 gms., 5 sec.) _____ 0
Softening point (ASTM D30-26) _____° F__ 250
Solubility in 86° naphtha _____percent__ 50.6
Ductility at 77° F. (ASTM D113-44, 5 cm. per min.) _____ 0
Viscosity at 347° F. (ASTM D88-44, Saybolt Furol) sec. _____ 130

*Table XII*

| Composition | Type of Rosin | Asphalt | Percent Urea Remaining After 72 Hours Under Water |
|---|---|---|---|
| 1 | Polymerized Rosin | None | 15 |
|   |   | 5% | 25 |
| 2 | Hydrogenated Rosin | None | 30 |
|   |   | 5% | 40 |
| 3 | Unmodified Rosin | None | 70 |
|   |   | 5% | 78 |
| 4 | Calcium Salt of Polymerized Rosin Calcium Content, 6%. | None | 51 |
|   |   | 5% | 66 |
| 5 | Glycerol Ester of Polymerized Rosin. | None | 25 |
|   |   | 5% | 40 |
| 6 | Partially Oxidized Polymerized Wood Rosin (3 days, 140° F.). | None | 80 |
|   |   | 5% | 90 |
| 7 | Glycerol Ester of Unmodified Rosin. | None | 32 |
|   |   | 5% | 45 |
| 8 | Partially Oxidized Calcium Salt of Polymerized Rosin Calcium Content, 8%. | None | 77 |
|   |   | 5% | 84 |

It is evident from the data that the addition of 5% asphalt results in a significant improvement in fertilizer water resistance. Significant improvements are also obtained when asphalt is added to other urea-wax-rosin compositions containing other types of rosin than those specifically mentioned in Table XII.

It is important to note that no water resistance improvement is obtained by dissolving asphalt in the wax unless rosin is also dissolved in the wax. This surprising fact is better illustrated by FIGURE 4 which shows the effect of adding asphalt to the wax component of a dispersion of urea in wax alone, i.e., to a composition containing no rosin. Each composition represented by the graph of FIGURE 4 contains 57% urea-43% wax phase. The wax contains varying amounts of asphalt, the balance of the wax phase being wax. The asphalt is the same type used in the compositions of Table XII.

Figure 4:
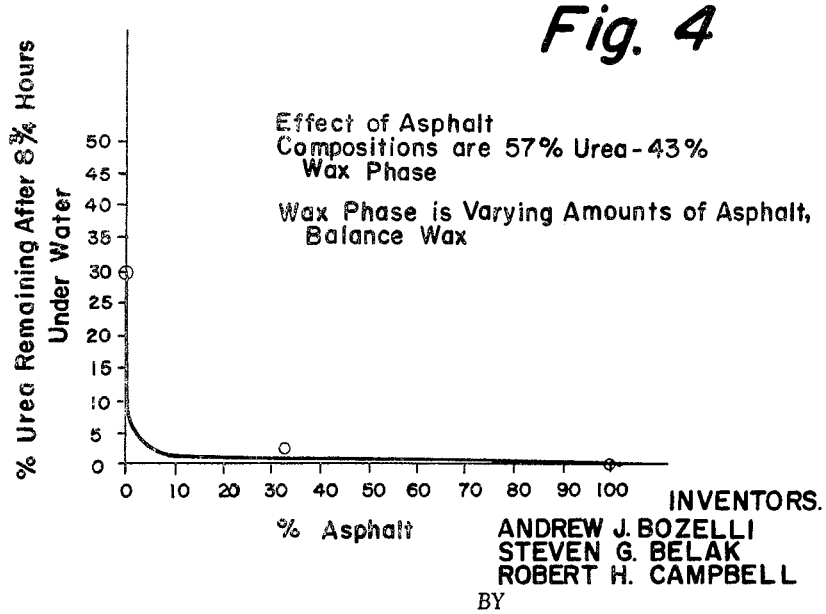

It is clear from FIGURE 4 that the use of a mixture of wax and asphalt is inferior to the use of wax alone. Surprisingly, however, if rosin is present in the wax then the asphalt has just the opposite effect, that is, it increases water resistance. However, even when rosin is present the amount of asphalt must still be relatively small in order to obtain an improvement in water resistance. This is shown more clearly by FIGURES 5 and 6 which show the effect of asphalt content on the water resistance of a urea-wax-rosin fertilizer. The compositions represented by FIGURE 5 all contain 57% urea-43% wax phase, the latter containing 10% partially oxidized (2.5 days at 140° F.) polymerized wood rosin, the stated amount of asphalt, the balance of the wax phase being wax. All percentages except urea are again based on the total wax phase, i.e., wax, rosin, and asphalt. The asphalt used is the same type as used in the compositions of Table XII. The compositions represented by FIGURE 6 are identical to those of FIGURE 5 except that the rosin is not partially oxidized, and in addition, the amount of rosin employed is 5% rather than 10%.

Figure 5:
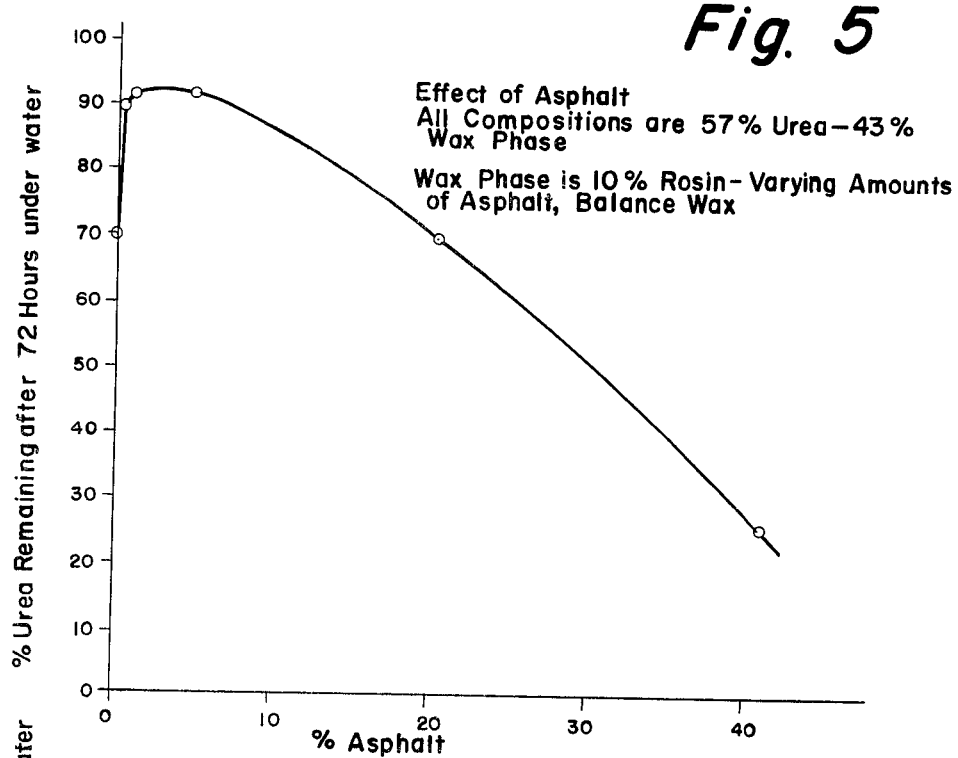
Figure 6:
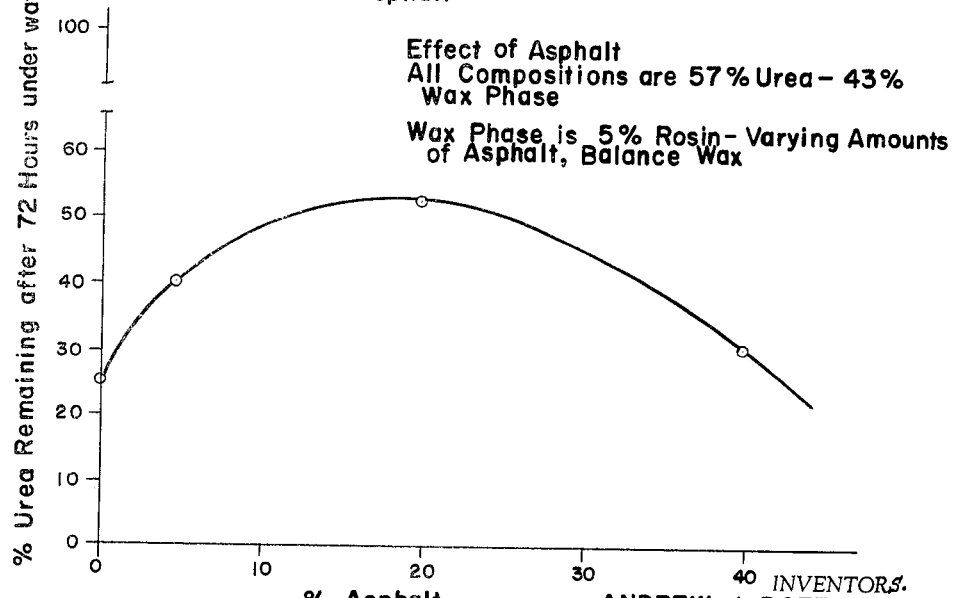

It is apparent from FIGURES 5 and 6 that only relatively small amounts of asphalt effect improvement in the fertilizer water resistance and that large amounts are either no better or worse than no asphalt.

The amount of asphalt in the wax-urea-rosin-asphalt compositions of the invention can vary somewhat within certain limitations, but is best understood initially by visualizing the composition as being obtained by replacing part of the wax in a urea-wax-rosin fertilizer with asphalt. The amount of asphalt should, of course, be sufficient to improve the water resistance of the composition. For example, 5% asphalt in a wax phase containing 5% rosin is satisfactory because a wax phase containing 90% wax-5% rosin-5% asphalt provides better water resistance to urea than a wax phase containing 95% wax-5% rosin.

Secondly the amount of asphalt should in all cases be a minor amount of the total wax phase. Within this minor amount limitation the amount of asphalt used will vary. The maximum amount of asphalt which can be used and still effect an improvement in water resistance varies inversely with the water resistance of the corresponding composition containing no asphalt. This is evident from a comparison of FIGURES 5 and 6. In FIGURE 6 an asphalt content as high as about 40%, based on the total wax phase, can be used to effect improved water resistance while in FIGURE 5 the maximum asphalt content resulting in improved water resistance is about 20%. In general, for those wax-urea-rosin compositions which have a water resistance of more than 50% urea remaining after submergence in water for 72 hours the maximum amount of asphalt to be used is about 20% and in such a case the maximum amount of asphalt is preferably 15%, more preferably 10%. For those wax-urea compositions which have a water resistance of less than 50% urea remaining after submergence in water for 72 hours, the maximum amount of asphalt to be used is about 40%, and in such a case the maximum amount is preferably 30%, more preferably 20%. The minimum amount of asphalt which should be added to the wax phase to effect improved water resistance is 0.25%. Preferably at least 1%, more preferably 3%, is used. All asphalt percentages are based on the total wax phase, i.e., the total amount of wax, rosin, and asphalt.

The asphaltic compositions of the invention are the same, except for the presence of asphalt, as the urea-wax-rosin compositions described heretofore. In other words, characteristics of the urea-wax-rosin-asphalt compositions such as amount of rosin, type of rosin, fertilizer ingredient, type of wax, preferred amounts and types of ingredients, etc. are the same as in the urea-wax-rosin composition. In the discussion of urea-wax-rosin compositions the amount of rosin was specified based on the total wax phase, the latter being wax plus rosin. In the asphaltic compositions the amounts are the same and they are still based on total wax phase, but the total wax phase it, of course, wax-rosin-asphalt. The asphaltic compositions are, of course, limited to a urea fertilizer in the same manner as the previously described compositions.

A broad range of asphalts can be used in the asphaltic compositions of the invention. For example, suitable asphalts are those derived from petroleum which are usually vacuum distillation bottoms obtained in the processing of asphaltic crude oils according to conventional petroleum refining techniques. Such asphalts or treated forms thereof generally have the following properties:

Specific gravity at 77° F. _____ 0.8– 1.5
Penetration at 77° F. (ASTM D5–47, 100 gms.,
  5 sec.) _____dmm__ 0–300
Softening point (ASTM D30–26) _____° F__ 50–350
Solubility in 86° naphtha _____percent__ 40– 98
Ductility at 77° F. (ASTM D113–44, 5 cm. per
  min.) _____cm__ 0–150
Viscosity at 347° F. (ASTM D88–44, Saybolt-
  Furol) _____sec__ 30–700

In one respect, particularly suitable asphalts are vacuum distillation bottoms which have been solvent extracted and/or oxidized to a high softening point, low penetration, and low ductility. They are hard and brittle at ambient temperatures and have no tendency to become sticky or to cold flow. They are particularly suitable for fertilizers since the latter should be free flowing at any ambient temperatures encountered between manufacture and consumer use. Such asphalts generally have properties as follows:

Specific gravity at 77° F. _____ 0.8– 1.5
Penetration at 77° F. (ASTM D5–47, 100 gms.,
  5 sec.) _____dmm__ 0– 20
Softening point (ASTM D30–26) _____° F__ 175–350
Solubility in 86° naphtha _____percent__ 40– 98
Ductility at 77° F. (ASTM D113–44, 5 cm. per
  min.) _____cm__ 0– 10
Viscosity at 347° F. (ASTM D88–44, Saybolt-
  Furol) _____sec__ 30–700

Particularly suitable asphalts in another respect are vacuum distillation bottoms which have not been treated by, say, solvent extraction, air blowing, etc., for the purpose of increasing their softening point. While these asphalts are relatively soft and result in fertilizer particles which have a greater tendency to cake at high temperatures, such asphalts result in greater improvement in water resistance than the harder asphalts. This is shown more clearly by the data contained in Table XIII which shows the water resistance of a slow release fertilizer containing urea, wax, partially oxidized polymerized rosin, and asphalt. Each composition contains 60% urea-40% wax phase, the wax phase being 90% wax-5% rosin-5% asphalt or 95% wax-5% rosin as indicated in the table. The compositions are identical in all respects except for the type of asphalt. Composition 1 contains no asphalt, Composition 2 contains a hard asphalt, the same type used in the compositions of Table XII, while Composition 3 contains a soft asphalt.

*Table XIII*

| Composition | Type of Asphalt | Percent Urea Remaining After 72 Hours Under Water |
|---|---|---|
| 1 | None | 85 |
| 2 | Hard Asphalt: Penetration=0; Softening Pt.=250° F. | 90 |
| 3 | Soft Asphalt: Penetration=2,300; Softening Pt.=75° F. | 96 |

Soft asphalts, preferred from a water resistance improvement standpoint generally have properties as follows:

Specific gravity at 77° F. _____ 0.8– 1.2
Penetration at 77° F. (ASTM D5–47, 100 gms.,
  5 sec.) _____ >20
Softening point (ASTM D30–26) _____° F__ 50–175
Solubility in 86° naphtha _____percent__ 40– 98
Ductility at 77° F. (ASTM D113–44, 5 cm. per
  min.) _____cm__ 10–150
Viscosity at 347° F. (ASTM D88–44, Saybolt-
  Furol) _____sec__ 30–120

In the foregoing description the asphalt component of the asphaltic compositions of the invention has been described as being dissolved, incorporated, etc. in the wax. As in the case of adding rosin to wax, these terms are considered equivalent. Even though the term dissolved may not be technically correct, when asphalt is mixed with wax at an elevated temperature the wax and most if not all of the asphalt combine to form a substantially homogeneous single phase which has the appearance of a true solution. In view of this the mixture is described as a solution. In many cases, especially with hard, high softening point asphalts, a small portion of the asphalt does not dissolve in the wax but appears as a residue which will settle to the bottom of a tank in which the asphalt and wax are mixed. It was mentioned that in the case of mixing rosin and wax, a residue appears infrequently. In the case of asphalt, such residue appears more frequently. It can, however, be disregarded for it does not detract from the properties of the compositions as heretofore described. Of course, any such residue is not considered as being dissolved in the wax.

The following specific example illustrates the preparation of an asphaltic composition of the invention.

EXAMPLE III

The procedure is the same as in Example I heretofore except that instead of using 31.5 parts wax, 29.75 parts wax is used. In addition, 1.75 parts asphalt of the type used in the compositions of Table XII is added to the molten wax along with the rosin. The final composition contains 65% urea-35% wax phase and the wax phase is 85% wax-10% rosin-5% asphalt.

ADDUCTION

It has already been described how a mixture of urea and molten paraffin wax reacts to form an adduct during the normal preparation of a urea-wax slow release fertilizer. For reasons stated heretofore, it is sometimes desirable to prevent or at least substantially delay the reaction so that it does not occur during the time the dispersion is being formed into solid fertilizer particles.

We have now discovered that if rosin is dissolved in the molten paraffin wax adduction either does not occur or is substantially delayed when the latter is subsequently mixed with urea. In other words rosin inhibits the formation of the adduct.

The types of rosin which are suitable for preventing the adduction of urea and molten paraffin wax are the same as those described as suitable for improving the water resistance of the wax phase of a urea-wax slow release fertilizer. In other words either unmodified rosin or modified rosin can be used. Unmodified wood rosin is preferred because of its generally lower cost.

The amount of rosin required to prevent or substantially delay adduction is 1% by weight of the molten paraffin wax. Preferably the amount used is 3% by weight of the molten paraffin wax. Amounts as high as 15–20% can be used but preferably the amount of rosin does not exceed 10%. More preferably the amount of rosin is about 5% by weight of the molten paraffin wax. In any case the amount of rosin should be a stabilizing amount, i.e., an amount sufficient to prevent adduction of the molten paraffin wax and urea for the period of time required to form the dispersion of urea in wax into solid fertilizer particles. Preferably the rosin is the sole adduct inhibitor used.

In the immediate aspect the invention is a method of forming a stable dispersion of urea and molten paraffin wax, stable in that the urea and molten wax do not react to form an adduct. In this aspect the invention is limited to a dispersion containing paraffin wax. Microcrystalline wax is suitable for use in the preparation of slow release urea-wax fertilizers but it does not react with urea to form an adduct. The differences between paraffin wax and microcrystalline wax (and other kinds of waxes) have been adequately described heretofore.

The amount of urea ultimately mixed with the molten paraffin wax is not critical in the present method aspect of the invention since any amount of urea will react, at least in part, with molten paraffin wax to form an adduct. However, a slow release urea-wax fertilizer will normally contain 5–80 parts urea, usually 10–70 parts, more frequently 20–70 parts, and 15–49 parts of wax phase, more frequently 25–49 parts, the wax phase being molten paraffin wax and the rosin inhibitor dissolved therein. Consequently the method of the invention now being described will most frequently be applicable to these amounts of urea and molten paraffin wax phase.

The stable dispersion is formed according to the invention by mixing urea with molten paraffin wax, the latter having rosin dissolved therein and the amount of the ingredients being as already specified. The order in which the three ingredients are mixed is not critical so long as certain precautions are observed. One scheme involves heating the paraffin wax to a temperature of about 240°–250° F., adding the rosin and stirring the resulting mixture until the rosin dissolves in the wax. This dissolution occurs fairly rapidly since a temperature of 240°–250° F. is above the melting point of most rosins. After the rosin has dissolved the wax-rosin mixture is cooled to a temperature slightly, e.g., about 10° F., above the melting point of the wax. The urea is then added to and dispersed in the molten wax phase. The reason for cooling the wax-rosin mixture to a temperature slightly above the melting point of the wax is to eliminate any possibility for adduction to occur upon subsequent addition of urea. The adduction reaction would be more likely to occur at higher temperatures, hence reducing the temperature aids in preventing it. In addition, at a temperature of slightly above the wax melting point the wax-rosin mixture is just about as fluid as it is at 240°–250° F., hence there is no greater problem dispersing the urea therein. The method described, i.e., dissolving the rosin in the wax prior to adding the urea, is the preferred method. Alternatively the urea can be dispersed in the molten paraffin wax after which the rosin is mixed with the dispersion and is allowed to dissolve in the molten wax. This method is considerably less preferable since the dispersion of urea in molten paraffin wax is unstable and reacts to form the adduct within a relatively short period of time. Extreme care must therefore be exercised to incorporate the rosin prior to the time the adduct forms. This will be difficult to accomplish in many cases, since the urea and molten paraffin wax sometimes react quite rapidly. This is especially true in the case of urea particles having a particle size smaller than about 100–150 mesh. This problem is obviated by premixing the molten wax and rosin and then mixing the urea with the resulting molten wax phase.

The following examples specifically illustrate the method of the invention now being discussed.

EXAMPLE IV

Into a mixing tank equipped with heating and agitation means is charged 40 parts of paraffin wax. The wax is heated to 240° F. at which point it was molten. Next 60 parts of commercial crystal urea is added to the wax with agitation. Five minutes after addition of the urea the entire contents of the tank have become a solid having about the texture of wet sand. Analysis of the solid shows that it contains a substantial amount of a urea-paraffin wax adduct, a lesser amount of paraffin wax and essentially no free urea. Next the foregoing procedure is repeated except that the wax is heated to 140° F. Adduction again occurred five minutes after addition of urea.

EXAMPLE V

The procedure is the same as in Example IV with the wax being heated to 240° F. except that prior to adding the urea 3% by weight on the wax (1.2 parts) of polymerized wood rosin is added to the wax and the wax-rosin mixture is stirred until the rosin dissolves in the wax. The temperature of the wax-rosin mixture at the time the urea is added is 240° F. After the urea is added stirring is continued. After 1 hour of stirring adduction has not occurred. The contents of the tank are still fluid. The dispersion has a grainy texture to the presence of the solid urea particles but is definitely fluid in that it takes the shape of any container in which it is placed, can be poured, pumped, etc. The dispersion can be readily formed into small particles. After 1 hour the experiment is ended.

EXAMPLE VI

The procedure is the same as in Example V except that the rosin employed is unmodified wood rosin. After 1 hour of stirring adduction has not occurred. The same observations as in Example V are made.

EXAMPLE VII

The procedure is the same as in Example V except that the rosin employed is the glycerol ester of hydrogenated wood rosin. After 1 hour of stirring adduction has not occurred. The same observations as in Example V are made.

EXAMPLE VIII

The procedure is the same as in Example V except that the rosin used is the calcium salt of polymerized wood rosin containing 6% calcium. After 1 hour of stirring adduction has not occurred. The same observations as in Example V are made.

EXAMPLE IX

The procedure is the same as in Example V except that the rosin used is a rosin modified phenol-formaldehyde resin. (Rohm and Haas, Amberol M21.) After 1 hour of stirring adduction has not occurred. The same observations as in Example V are made.

EXAMPLE X

The procedure is the same as in Example V except that the rosin used is the pentaerythritol ester of unmodified wood rosin. After 1 hour of stirring adduction has not occurred. The same observations as in Example V are made.

FLUIDIZATION

In any slow release fertilizer which comprises a dispersion of a solid fertilizer compound in wax it is desirable that the particle size of the dispersed fertilizer compound be quite small, at least smaller than 120 mesh. There are several reasons for this. One, some of the fertilizer particles may be broken by rough handling during storage and shipment and if this happens it is desirable that the broken particles have essentially the same composition as the original unbroken particles. This can be achieved only if each original particle has the same composition throughout. The uniformity of any particle is, of course, increased as the particle size of the solid fertilizer ingredient decreases.

Another reason is that the rate at which the fertilizer ingredient is leached out of the wax phase tends to increase as the fertilizer particle size increases. Consequently it is again generally desirable to reduce the particle size of the fertilizer ingredients.

We have found that for maximum commercial acceptance the fertilizer particles dispersed in wax should have a particle size smaller than 120 mesh, preferably smaller than 200 mesh. However, when a major amount of urea and/or any of the other conventional fertilizers previously mentioned is subdivided to a size less than 120 mesh and mixed with, i.e., dispersed in, a minor amount of molten wax, the wax containing an adduct inhibitor when the wax is paraffin wax and urea is present, the resulting mixture is not at all fluid but rather has about the texture of putty. Because it is so thick and unflowable it is more difficult to process the dispersion into small particles. This putty-like composition is to be distinguished from solid compositions which ofen result when urea and molten paraffin wax are mixed because of reaction between the urea and wax to form an adduct. The putty-like nature is obtained when fertilizers which do not form adducts, such as potassium chloride, are mixed with molten paraffin wax. Similarly when urea is mixed with paraffin wax, the latter containing rosin dissolved therein to prevent adduct formation, the resulting dispersion has a putty-like consistency. Actually the putty-like consistency is due to the large surface area of fertilizer particles smaller than 120 mesh. Apparently the fertilizer particles absorb most of the wax, any unabsorbed wax being insufficient in amount to render the fertilizer-absorbed wax particles flowable. That this is the case is shown by the fact that when fertilizers having a particle size of 80–100 mesh are mixed with wax the resulting dispersion is not putty-like but rather is flowable.

We have found that if a major amount of solid fertilizer compound having a particle size of smaller than 120 mesh, preferably smaller than 200 mesh, is dispersed in wax containing asphalt dissolved therein the fluidity of the resulting dispersion is substantially increased. Although it has a grainy texture due to the fertilizer particles present the dispersion is in most cases definitely fluid, i.e., it will take the shape of its container, it can be poured, etc. This latter difference between the compositions with asphalt and without asphalt is truly remarkable. Without asphalt the composition is similar in flowability to putty. With asphalt it is similar in flowability to paint or melted chocolate. The surprising nature of this result is more readily appreciated when it is considered that the result is obtained even when an asphalt having a softening point as high as 250° F. is used. Such an asphalt is, at 250–260° F., about as viscous as the dispersion it is desired to fluidize. Yet when such an asphalt is present in the dispersion the latter is more fluid than either the asphalt alone or the asphalt free dispersion.

The fluid dispersion of small size solid fertilizer particles in wax is prepared by mixing the particles with wax, the wax having asphalt dissolved therein. For example, the wax is heated to about 240°–250° F., the asphalt is added to the molten wax, and the mixture stirred until the asphalt dissolves in the wax. The fertilizer, or fertilizers as the case may be, which has been subdivided to the desired size is then added to the wax phase and stirred until uniformly dispersed therein. The resulting dispersion is substantially more fluid than when the asphalt is omitted. Although this scheme is satisfactory it has a disadvantage in that it requires separate handling of small size fertilizer particles. Particles smaller than 120 mesh tend to agglomerate, be dusty, etc. and are harder to disperse in wax in conventional agitated vessels than are larger particles. Consequently a preferred method of forming a fluid dispersion is to first mix fertilizer particles having a relatively large size, say about 60–80 mesh, in the molten wax containing asphalt dissolved therein. After this initial gross dispersion is formed it is passed as a fluid through a roller mill having a clearance small enough to reduce the fertilizer particle size to smaller than 120 mesh, preferably smaller than 200 mesh. This technique has advantages in that the particles are subdivided in situ in the wax; hence there is no dust problem, etc. and the roller mills disperse the fertilizer in the wax more uniformly than can usually be done in conventional agitated vessels. Furthermore, the fertilizer particle size can usually even be reduced to as small as 400 mesh in a roller mill. In preparing fertilizers the smaller the size of the fertilizer ingredient the more desirable is the product.

Although the material charged to the roller mill is fluid the discharge from the mill is often a dry powdery solid. This is due to cooling and solidification of the wax in the course of milling. When this happens the solid discharge should be heated to its original temperature of about 240°–250° F. and the wax will melt again.

The amount of asphalt used should, of course, be sufficient to substantially improve the fluidity of the dispersion which would be obtained if no asphalt is used. Normally the amount of asphalt will be at least 2% by weight of the wax, although preferably 3%, more preferably 5% is used. Amounts as high as 20% can be used although normally not more than 10% will be employed.

Any type of asphalt can be used, such as an oxidized, unoxidized, etc. asphalt. Typical properties of most asphalts have been given heretofore. Preferably the asphalt has a high softening point and low penetration. Such asphalts are generally effective in lesser amounts than relatively soft asphalts. Typical properties of such asphalts have also been given heretofore.

The fluid dispersions formed by the method of the invention can contain either paraffin or microcrystalline wax. These waxes and preferred properties, etc. thereof have already been described.

The fluid dispersions of the invention can contain any solid fertilizer compound or mixtures thereof. Examples of those most frequently used at the present time have been described. The particle size of the fertilizer ingredients will be small than 120 mesh, preferably smaller than 200 mesh.

The total amount of solid fertilizer ingredients and the amount of wax phase, i.e., wax and asphalt, will be a major amount, i.e., more than 50%, and a minor amount, i.e., less than 50%, respectively, each based on the total composition weight. More frequently the total amount of fertilizer will be 50–80 parts and the total amount of wax phase will be 15–49 parts, more frequently 25–49 parts.

A fertilizer ingredient of the dispersion and the wax component thereof can be, as mentioned, and preferably is, urea and paraffin wax. Where such is the case the paraffin wax preferably contains an adduct inhibitor in order to prevent adduction of the urea prior to forming the fluid dispersion into fertilizer particles. Such inhibitor can be any of those mentioned previously although preferably it is rosin. It should be used in an amount sufficient to inhibit adduction, such amounts being described hereinbefore. Also preferably, the mixture of urea and molten paraffin wax, the latter having asphalt and an adduct inhibitor such as rosin dissolved therein, is maintained at a temperature slightly above the melting point of the wax rather than 240°–250° F. as further insurance against adduction. This procedure was described hereinbefore. For example, if after milling a urea-wax-rosin-asphalt mixture the mill discharge is solid, it is preferably heated to slightly above the wax melting point rather than to 240°–250° F. It will be found that if the wax has a melting point of 125° F., for example, the fluidity of the dispersion is about the same at 130°–135° F. as it is at 240° F. In the case of fertilizers other than urea it may also be desirable to dissolve certain additives in the wax. Regardless of the particular fertilizer employed and the additives used besides asphalt, it is preferred that the total wax phase, i.e., wax plus all additives dissolved therein be 15–49 parts, more preferably 25–49 parts, that the wax component be a major proportion of the wax phase, and that the amount of asphalt used to improve fluidity be as already specified.

In using asphalt to improve the fluidity of a dispersion of urea in wax, the wax optionally containing rosin, maximum fluidity is achieved at certain fertilizer contents which vary depending upon the particular fertilizer. As noted above asphalt substantially improves the fluidity of a dispersion of a major amount of fertilizer in a minor amount of wax. The maximum degree of fluidity is obtained at various fertilizer contents within this major amount limitation. In all cases maximum fluidity is obtained between 50 and 80% fertilizer. Where the fertilizer is urea maximum fluidity is obtained at a urea content of about 53–65%, i.e., urea=53–65%, balance of composition is wax phase. With potassium chloride maximum fluidity is obtained at about 60–70% KCl. In the case of potassium sulfate maximum fluidity is obtained at a $K_2SO_4$ content of 70–80%. With diammonium phosphate maximum fluidity is obtained at about 55–65%. With super and triple superphosphate maximum fluidity is obtained at about 60–70%. With mixtures of these fertilizers the optimum amount is about what would be expected by interpolating between the amounts specified above for the individual fertilizers.

Not only do the amounts specified above result in maximum fluidity but they also result in actual fluidity, i.e., the dispersion formed can be poured, will take the shape of its container, etc. Stated otherwise, the dispersion is flowable. In other words, asphalt improves the fluidity of any dispersion of a major amount of fertilizer in a minor amount of wax but actual fluidity is obtained at the fertilizer levels specified above.

The method of the invention just described is illustrated by the following examples.

EXAMPLE XI 40.85 grams of paraffin wax is heated to 250° F. in a 250 ml. beaker. To the wax is added 2.15 grams of polymerized rosin and the mixture is stirred until the rosin dissolves in the wax. Next 57 grams urea having a particle size of 60–100 mesh is added to and dispersed in the wax phase by hand-stirring. The fluid dispersion is then passed through a roller mill equipped with 3 rollers turning in such manner that the dispersion passes downwardly through the first two rollers and then upwardly between the second and third rollers. The clearance of the rollers is such that the urea in the dispersion discharged from the mill has a particle size of approximately 200 mesh.

The discharge from the mill is a dry powdery solid. A portion of it is charged to a standard 250 ml. beaker (2½ inches diameter) and is heated to 140° F. on a hot plate with stirring, although the latter is accomplished with some difficulty because of the heavy consistency of the mass. After heating to 140° F. the mass is extremely viscous and has a putty-like texture. It does not take the shape of the beaker. The beaker is removed from the hot plate and inverted but in 5 seconds none of the dispersion drains out of the beaker. Next the mass is heated to 240° F. after which the beaker is removed and inverted as before. None of the dispersion drains out of the beaker.

EXAMPLE XII

The procedure is the same as in Example XI except that along with the rosin 2.04 parts of asphalt (5% based on wax) is added to the wax along with the rosin. The asphalt used in this and subsequent examples is the same type used in the compositions represented by FIGURE 5.

After heating the milled dispersion to 140° F. it is fluid and takes the shape of the beaker. When the beaker is inverted the dispersion drains out immediately, i.e., in 1–2 seconds.

EXAMPLE XIII

The procedure is the same as in Example XI except that 35 parts wax is used and 65 parts potassium chloride is used instead of the urea. No rosin is employed. With respect to the final dispersion the same observations are made as in Example XI. In Example XIII the milled dispersion is heated to 240° F.

EXAMPLE XIV

The procedure is the same as in Example XIII except that 3% asphalt by weight of the wax is dissolved in the wax prior to addition of the KCl. The observations on the final dispersion are the same as in Example XII.

EXAMPLE XV

The procedure is the same as in Example XIII except that the fertilizer is triple superphosphate. The observations on the final dispersion are the same as in Example XI.

EXAMPLE XVI

The procedure is the same as in Example XV except that 5% asphalt, based on the wax, is dissolved in the wax prior to dispersing the fertilizer therein. The observations on the final dispersion are the same as in Example XII.

EXAMPLE XVII

The procedure is the same as in Example XIII except that instead of using 65 parts KCl, 75 parts of $K_2SO_4$ are used and the amount of wax used is 25 parts. The observations on the final dispersion are the same as in Example XI.

EXAMPLE XVIII

The procedure is the same as in Example XVII except that 5% asphalt based on the weight of wax is dissolved in the wax prior to dispersing the fertilizer therein. The observations on the final dispersion are the same as in Example XIII.

Throughout this disclosure the terms urea, urea-paraffin wax adduct, adduct, etc. have been used. A urea adduct is a compound distinct from urea and the terms are used in this sense. In other words urea does not include a urea-paraffin wax adduct and, similarily, the latter does not include the former.

The invention claimed is:

1. A slow release fertilizer composition comprising a dispersion of solid urea in solid petroleum wax said composition being characterized in that substantially all the particles of said solid urea are surrounded by and encased in said petroleum wax, said petroleum wax having dissolved therein a minor amount of rosin selected from the group consisting of (1) polymerized wood rosin, (2) hydrogenated wood rosin, (3) mono and polyhydric alcohol esters of polymerized, hydrogenated, and unmodified wood rosin, and (4) polyvalent metal salts of polymerized, hydrogenated, and unmodified wood rosin, each of (1), (2), (3), and (4) being partially oxidized to an extent equivalent to oxidation at 140° F. for a period of 1–8 days, said partial oxidation being sufficient to result in a decreased rate of leaching when said composition is contacted with water, said minor amount being based on the total weight of rosin and said wax.

2. Composition according to claim 1 wherein said rosin is polymerized wood rosin.

3. Composition according to claim 1 wherein said rosin is the calcium salt of polymerized wood rosin containing, before said partial oxidation, 7–10% calcium.

4. Composition according to claim 1 wherein the amount of urea is 5–80 parts, the total amount of wax and rosin is 15–49 parts, and the amount of rosin is 2–20% based on the total weight of wax and rosin.

5. A slow release fertilizer composition comprising a dispersion of solid urea in solid petroleum wax, said petroleum wax having rosin and asphalt dissolved therein, said composition being characterized in that substantially all the particles of said solid urea are surrounded by and encased in said petroleum wax, the amount of rosin and asphalt being based on the total weight of petroleum wax, rosin, and asphalt, and being as follows: rosin, a minor amount; asphalt, a minor amount effective to improve the water resistance of the composition.

6. A slow release fertilizer composition comprising a dispersion of solid urea in solid petroleum wax, said petroleum wax having rosin and asphalt dissolved therein, said composition being characterized in that substantially all the particles of said solid urea are surrounded by and encased in said petroleum wax, the amount of solid urea being 5–80 parts, the total amount of petroleum wax, rosin, and asphalt being 15–49 parts, the amount of rosin and asphalt being based on the total amount of petroleum wax, rosin, and asphalt, and being as follows: rosin 1–35%; asphalt 0.25–20% effective to improve the water resistance of the composition.

7. Composition according to claim 6 wherein the amount of asphalt is 1–10%.

8. Composition according to claim 5 wherein said rosin is selected from the group consisting of (1) polymerized wood rosin, (2) hydrogenated wood rosin, (3) mono and polyhydric alcohol esters of polymerized, hydrogenated, and unmodified wood rosin, and (4) polyvalent metal salts of polymerized, hydrogenated, and unmodified wood rosin, each of (1), (2), (3), and (4) being partially oxidized to an extent equivalent to oxidation at 140° F. for a period of 1–8 days, said partial oxidation being sufficient to result in a decreased rate of leaching when said composition is contacted with water.

9. Composition according to claim 8 wherein said rosin is polymerized wood rosin.

10. In a process in which solid urea is dispersed in a molten paraffin wax which normally reacts with said solid urea to form an adduct and the resulting mixture is subsequently cooled to below the melting point of said wax whereby a solid slow release fertilizer is obtained the improvement for inhibiting reaction between said solid urea and said molten paraffin wax to form an adduct which comprises dissolving rosin in said molten paraffin wax, the amount of rosin being at least 1% by weight of said wax, sufficient to inhibit said reaction.

11. Method of forming a slow release fertilizer comprising a dispersion of solid urea in a solid paraffin wax which when in molten state normally reacts with solid urea to form an adduct which comprises (1) heating said paraffin wax to above its melting point whereby molten paraffin wax normally susceptible to adduction is obtained, (2) dissolving in said molten paraffin wax an adduct inhibiting amount of rosin in the range of 1–20% by weight of said molten paraffin wax, (3) dispersing solid urea in the molten paraffin wax containing said adduct inhibitor, and (4) cooling the resulting dispersion to below the melting point of said wax whereby a slow release fertilizer comprising a dispersion of solid urea in solid paraffin wax is contained.

12. Method according to claim 11 wherein the amount of said solid urea is 50–80 parts and the amount of said paraffin wax is 15–49 parts.

13. In a process in which a major amount of a solid fertilizer having a particle size smaller than 120 mesh is dispersed in a minor amount of molten petroleum wax, and the resulting dispersion is subsequently cooled below the melting point of the wax whereby a slow release fertilizer is obtained, said wax containing an adduct inhibitor when said fertilizer is urea and said molten wax is molten paraffin wax, the improvement for increasing the fluidity of said resulting dispersion which comprises dissolving in said molten petroleum wax a fluidizing amount, at least 2% by weight of said wax, of asphalt.

14. Method of forming a fluid dispersion of a solid fertilizer having a particle size smaller than 120 mesh in molten petroleum wax and then forming from said fluid dispersion a slow release fertilizer comprising a dispersion of solid fertilizer in solid petroleum wax which comprises (1) heating said wax to above its melting point whereby molten petroleum wax is obtained, (2) dissolving in said molten petroleum wax a fluidizing amount of asphalt in the range of 2–20% by weight of said molten petroleum wax, the total amount of wax and asphalt being 15–49 parts, (3) additionally dissolving in said molten wax an adduct inhibitor when said fertilizer is urea and said molten wax is molten paraffin wax, (4) dispersing 50–80 parts of said solid fertilizer in said molten wax containing said asphalt, and (5) cooling the resulting dispersion to below the melting point of said wax whereby a slow release fertilizer comprising a dispersion of solid fertilizer in solid wax is obtained.

15. Process according to claim 13 in which said solid fertilizer has a particle size smaller than 200 mesh.

References Cited by the Examiner
UNITED STATES PATENTS

| | | | |
|---|---|---|---|
| 2,936,226 | 5/1960 | Kaufman et al. | 71—64 |
| 3,014,783 | 12/1961 | Young | 71—64 |
| 3,034,858 | 5/1962 | Vives | 71—64 |
| 3,070,435 | 12/1962 | Reusser et al. | 71—64 |

References Cited by the Applicant
UNITED STATES PATENTS

| | | |
|---|---|---|
| 1,301,448 | 4/1919 | Johnston. |
| 1,648,861 | 11/1927 | O'Barr. |
| 2,211,738 | 8/1940 | Cairns. |
| 2,261,091 | 10/1941 | Maguire. |
| 2,399,987 | 5/1946 | Cordie et al. |

DONALL H. SYLVESTER, *Primary Examiner.*

ANTHONY SCIAMANNA, THOMAS KILEY,
*Examiners.*